United States Patent
Mulayin et al.

(10) Patent No.: US 10,693,847 B1
(45) Date of Patent: *Jun. 23, 2020

(54) SECURE MESSAGE SEARCH

(71) Applicant: Symphony Communication Services Holdings LLC, Palo Alto, CA (US)

(72) Inventors: Serkan Mulayin, San Francisco, CA (US); David M'Raihi, San Carlos, CA (US); Tim Casey, Campbell, CA (US); Michael Harmon, Saratoga, CA (US); Jon McLachlan, San Francisco, CA (US)

(73) Assignee: Symphony Communication Services Holdings LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/217,043

(22) Filed: Dec. 11, 2018

Related U.S. Application Data

(63) Continuation of application No. 15/223,592, filed on Jul. 29, 2016, now Pat. No. 10,237,246.
(Continued)

(51) Int. Cl.
*H04L 29/00* (2006.01)
*H04L 29/06* (2006.01)
(Continued)

(52) U.S. Cl.
CPC ........ *H04L 63/0428* (2013.01); *G06F 16/334* (2019.01); *G06F 16/951* (2019.01); *H04L 9/0631* (2013.01); *H04L 63/083* (2013.01)

(58) Field of Classification Search
CPC . H04L 63/0428; H04L 63/083; H04L 9/0631; H04L 9/00; H04L 63/08; G06F 17/30675; G06F 17/30864
See application file for complete search history.

(56) References Cited

U.S. PATENT DOCUMENTS

| 5,689,565 A | 11/1997 | Spies et al. |
| 8,266,433 B1 | 9/2012 | Przykucki et al. |

(Continued)

OTHER PUBLICATIONS

U.S. Appl. No. 15/714,734, filed Sep. 25, 2017, Authorizing Delegated Capabilities to Applications in a Secure End-To-End Communications System, M'Raihi.

*Primary Examiner* — Jeffrey C Pwu
*Assistant Examiner* — Helai Salehi
(74) *Attorney, Agent, or Firm* — Goodwin Procter LLP

(57) ABSTRACT

A communication server, interacting with an organization system having users that wish to communicate securely, provides secure communication capability to the users, without the communication server itself having access to unencrypted content of the user communications or to cryptographic keys that would allow the communication server to derive the unencrypted content. Thus, the communication server that provides the secure communication capability need not itself be trusted by the users with access to communicated content. To achieve this, the various entities communicate to exchange cryptographic keys in such a manner that the communication server never obtains usable copies of the cryptographic keys. Secure search capability is also provided by the client devices supplying a set of message tokens obtained by transformations that the communication server cannot replicate, and the communication server maintaining a search index storing the message tokens in association with the (encrypted) messages from which they were obtained.

20 Claims, 9 Drawing Sheets

Related U.S. Application Data

(60) Provisional application No. 62/199,803, filed on Jul. 31, 2015.

(51) Int. Cl.
*G06F 16/951* (2019.01)
*G06F 16/33* (2019.01)
*H04L 9/06* (2006.01)

(56) References Cited

U.S. PATENT DOCUMENTS

| | | |
|---|---|---|
| 9,591,479 B1 | 3/2017 | Leavy et al. |
| 9,667,416 B1 | 5/2017 | Machani et al. |
| 10,237,246 B1 | 3/2019 | Mulayin et al. |
| 10,432,589 B1 | 10/2019 | M'Raihi et al. |
| 2004/0117615 A1 | 6/2004 | O'Donnell et al. |
| 2005/0102244 A1 | 5/2005 | Dickinson et al. |
| 2005/0223216 A1 | 10/2005 | Chan et al. |
| 2006/0149962 A1 | 7/2006 | Fountain et al. |
| 2007/0136603 A1 | 6/2007 | Kuecuekyan |
| 2009/0089803 A1 | 4/2009 | Biggs |
| 2010/0257351 A1 | 10/2010 | O'Connor et al. |
| 2011/0167102 A1* | 7/2011 | Matzkel ............... H04L 63/0428 709/202 |
| 2011/0283110 A1 | 11/2011 | Dapkus et al. |
| 2011/0306320 A1* | 12/2011 | Saunders ............... H04W 12/06 455/411 |
| 2012/0173885 A1 | 7/2012 | Acar et al. |
| 2012/0254616 A1 | 10/2012 | Brown |
| 2013/0013921 A1 | 1/2013 | Bhathena et al. |
| 2013/0246791 A1 | 9/2013 | Di Crescenzo |
| 2014/0189797 A1 | 7/2014 | Nori et al. |
| 2014/0229729 A1 | 8/2014 | Roth et al. |
| 2014/0281553 A1 | 9/2014 | Illion et al. |
| 2014/0380429 A1 | 12/2014 | Matsugashita |
| 2015/0089244 A1 | 3/2015 | Roth et al. |
| 2016/0277400 A1 | 9/2016 | Maurya et al. |
| 2016/0294553 A1 | 10/2016 | Hattori et al. |
| 2016/0366113 A1 | 12/2016 | Dawoud |
| 2017/0262546 A1* | 9/2017 | Chen ..................... G06F 21/602 |
| 2017/0295398 A1 | 10/2017 | Delahaye et al. |

* cited by examiner

SECURE SEARCH 124

SECURE SEARCH 106

US 10,693,847 B1

SECURE MESSAGE SEARCH

RELATED APPLICATIONS

This application is a continuation of U.S. patent application Publication Ser. No. 15/223,592, filed on Jul. 29, 2016, which claims the benefit of Provisional Application No. 62/199,803, filed on Jul. 31, 2015, both of which are and incorporated herein by reference.

TECHNICAL FIELD

The disclosed embodiments relate generally to computer communications and, more specifically, to providing secure search of messages exchanged using a communications server.

BACKGROUND

Users often communicate with each other over the Internet in an unsecure manner. Unsecure communications are acceptable for many purposes where the information communicated is of a non-sensitive nature.

However, there are many contexts in which the information communicated is actually or potentially sensitive, such as when communicating confidential business details, conducting e-commerce, and the like. In such contexts, the communicating users should employ systems with cryptographic capabilities that can encrypt and decrypt the communicated information. This prevents intermediate parties—such as active eavesdroppers, or systems such as routers that make up the Internet architecture—from being able to obtain the communicated information in its original plaintext form.

The cryptographic infrastructure needed to allow users to easily and transparently secure their communications can be complex. Delegation of cryptographic functionality entails a certain degree of trust of the infrastructure components that provide the functionality. Accordingly, a third-party organization providing the cryptographic functionality may be able to exploit this trust to obtain the original, unencrypted communications. Such a risk may not be acceptable to some users, e.g., when conducting highly sensitive communications.

SUMMARY

In one embodiment, a computer-implemented method performed by a client device comprises: tokenizing a message into a set of tokens; selecting a salt value for the set of tokens; transforming the tokens using the selected salt value; encrypting the message; and sending the encrypted message and the transformed tokens to a communication server for delivery to a recipient client device.

In one embodiment, a computer-implemented method performed by a client device comprises receiving search text from a user; tokenizing the search text into a set of tokens; identifying a set of possible salt values for the set of tokens; generating a plurality of possible token sets by, for each of the possible salt values, transforming the set of tokens using the possible salt value; and sending the plurality of possible token sets to a communication server for identification of matching messages.

In one embodiment, a computer-implemented method performed by a communication server comprises storing a search index, comprising, for each of a plurality of messages: an encrypted form of the message, and a set of transformed tokens, the transformed tokens corresponding to tokens extracted from the message and transformed by the sending client device; receiving a set of transformed search tokens from a searching client device; identifying messages whose transformed tokens match the transformed search tokens; and sending the identified messages to the searching client device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
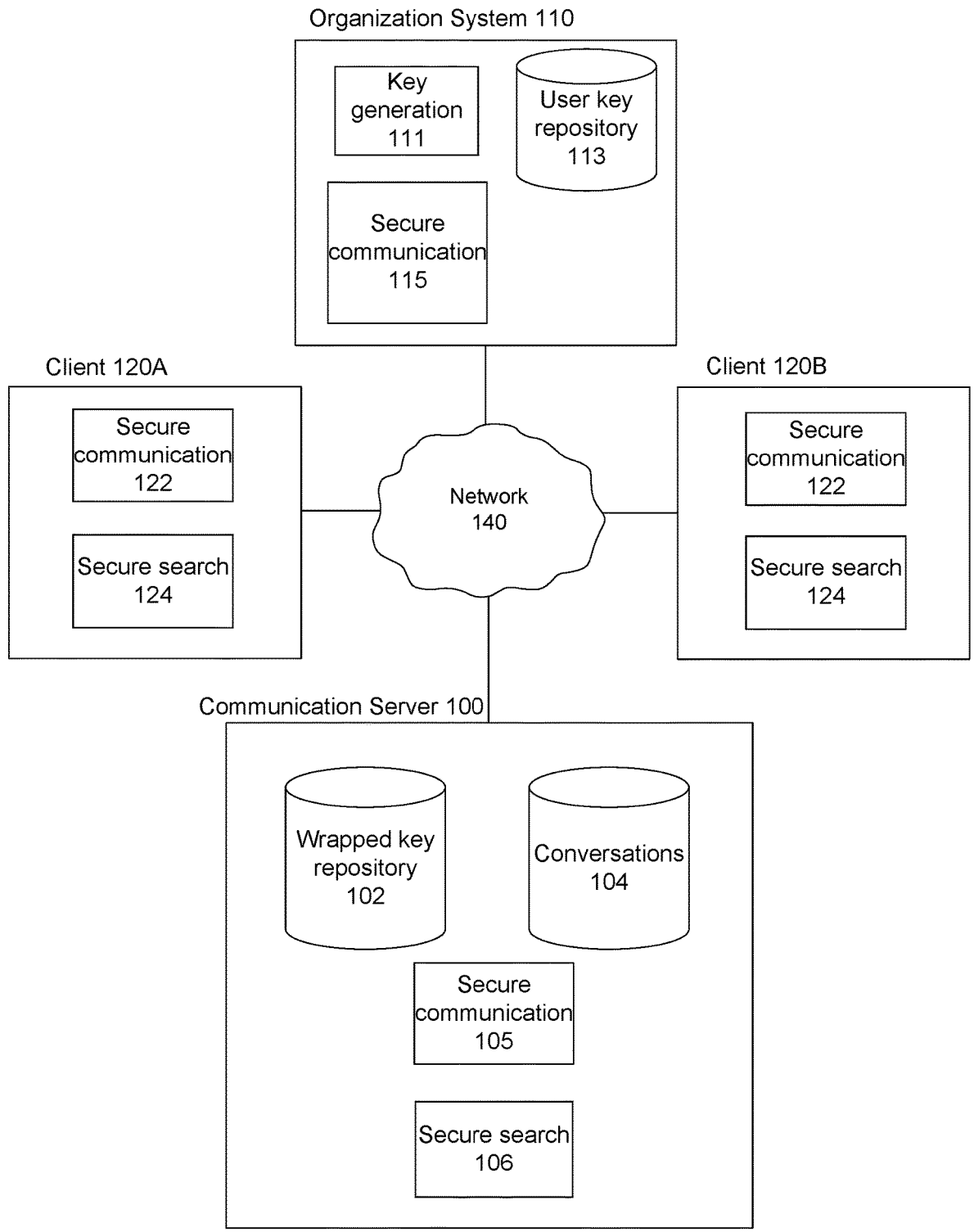
FIG. 1 shows a system environment in which secure communications takes place, according to one embodiment.

FIG. 1 shows a system environment in which secure communications takes place, according to one embodiment. Users of an organization that wishes its messages to be secure (the "communicating organization") send secure messages between their various client devices 120. To achieve the desired security, the client devices 120 use services of a secure communications infrastructure. The secure communications infrastructure is implemented by the interactions of several different components, including an organization system 110 under the control of the communicating organization, and a communication server 100 under the control of a security organization, as well as secure communication modules 122 installed on the client devices 120.

The secure communications infrastructure additionally provides users of the client devices 120 with a secure search functionality providing the ability to search for messages that the users had previously exchanged, without the communication server 100 or external third parties being able to deduce meaningful information about the messages, or the intent of the searching users, based on the searches. This secure search capability is provided by additional components, such as secure search modules 124 on the client devices 120, and a secure search module 106 on the communication server 100. The secure search functionality is described in more detail below with respect to FIGS. 5A, 5B, 6A, and 6B.

The organization system 110 is administered by the communicating organization, such as a business, educational institution, or governmental entity. The organization system 110 includes a key generation module 111 that generates cryptographic keys for use by its users when they securely communicate. The generated keys are stored (in encrypted form) in a user key repository 113. In one embodiment, the keys include an account key for each user, and a conversation key for each conversation in which the user can participate. As explained in more detail below, a "conversation" has a corresponding set of users that may participate in it and includes the messages exchanged between the participant users as part of that conversation. The organization system 110 also includes a secure communication module 115 that implements security protocols for interacting with the client devices 120 and communication server 100 to provide clients with secure communication capability.

The key generation module 111 and the key repository 113, as well as the secure communication module 115, may be implemented in different ways in different embodiments. For example, in one embodiment the key generation module 111, the key repository 113, and the secure communication module 115 are all implemented in hardware by a hardware security module (HSM) located on the premises of the communicating organization, which increases security of the keys. In other embodiments, the key generation module 111 and the secure communication module 115 are implemented in software, and the key repository 113 is stored in standard storage media, without any special hardware protection layer. Although the various components of the organization system are illustrated in FIG. 1 as being part of the organization system 110, in some embodiments they may be physically present in "the cloud" and accessed by the organization system 110 via the network 140.

In some embodiments, the key generation module 111 regenerates the cryptographic keys at different times, e.g., at a fixed time interval. In such embodiments, the user key repository 113 stores, for each user and each key for that user, a set of entries. Each entry includes the key itself and the time period during which the key is valid. For example, in cases where the conversation keys for users is rotated daily, the entries for user's conversation key include the conversation key and an indication of the day for which the key is valid. Then, when a user sends a new message as part of a conversation, the user's current conversation key is used; to decrypt an old message, the conversation key corresponding to the sending time of the old message is obtained and used to decrypt the old message.

In some embodiments, keys are generated from other keys, such as the conversation keys for a particular organization system 110 being derived in part based on the account key for that organization system. In some embodiments, older keys are deleted from the key repository 113 after the expiration of some key retention period (e.g., three months), and the data with which the deleted keys were encrypted may optionally also be deleted. Whether or not the encrypted data is deleted, as long as the encryption keys themselves (and any keys from which they were generated) have been deleted, the encrypted data cannot be decrypted.

The communication server 100 facilitates secure communications between the client devices 120 of users who are members of the communicating organization. For example, in embodiments in which the users communicate with each other via multi-user conversations, the communication server 100 includes a conversations repository 104 that stores metadata defining the conversations, as well as the (encrypted) messages that have been exchanged as part of the conversation. As previously noted, a conversation has a corresponding set of users that may participate in it and includes the messages exchanged between the participant users as part of that conversation. Thus, in one embodiment each conversation in the conversations repository 104 has corresponding metadata including a name of the conversation (e.g., "Project X negotiations", or "Sales team—Europe") and identifiers of a set of users of the organization system 110 that are permitted to participate in the conversation. The conversations repository 104 further stores the messages that have previously been exchanged between the various participants in a conversation. (As described below, the messages are exchanged in encrypted form, and thus the messages stored in the conversations repository 104 are likewise encrypted and hence not readable by the communication server 100 itself.) In one embodiment, for enhanced security an administrator of the organization system 110, or another user with similarly high access privileges, establishes the conversations, adding to the conversation those users that should be eligible participants in, and audience for, the conversation.

The communications server 100 includes a secure communications module 105 that facilitates communications between the various client devices 120. For example, and as illustrated below in more detail with respect to FIG. 2, the secure communications module 105 authenticates users of the organization system 110 and subsequently vouches for their identities, stores and provides encrypted keys, and performs other operations allowing users' client devices 120 to obtain appropriate cryptographic keys. As another example, illustrated below in more detail with respect to FIG. 3, the secure communications module 105 also distributes any messages sent by clients as part of conversations.

For instance, assume that a user A is using the client device 120A to send messages for the "Project X negotiations" conversation, and the "Project X negotiations" conversation is defined as having participant users A, B, and C. The secure communications module 105 may receive a (encrypted) message from user A as part of that conversation, and accordingly distribute the same messages to users B and C (the other participants in the conversation), as well as saving a copy of the message in the conversations repository 104 in association with the "Project X negotiations" conversation.

The communication server 100 additionally includes a wrapped key repository 102 populated with user cryptographic keys as a result of operations such as those illustrated in FIG. 2, below. The conversation keys of the users are "wrapped"—that is, stored in encrypted form—using keys not available to the communication server 100. (In some embodiments, other cryptographic keys of the users may be wrapped as well.)

The client devices 120 of the users are computing devices with sufficient ability to communicate over the network 140, e.g., with the communication server 100. Laptop or desktop computers, personal digital assistants, smartphones, tablet computers, and the like are examples of possible client devices 120. The client devices 120 each have a secure communication module 122 that allows the client devices to perform cryptographic operations and communicate with the communication server 100 to securely exchange messages. Actions of the client devices 120 illustrated in FIGS. 2-3, below, are examples of the operation of the secure communication module 122.

The client devices 120, the organization system(s) 110, and the communication server 100 communicate with each other through a network 140. The network may be any suitable communications network for data transmission. In one embodiment, the network 140 is the Internet and uses standard communications technologies and/or protocols.

In one embodiment, the security organization administering the communication server 100 also provides the organization system 110 with the software that implements the key generation module 111 and the secure communication module 115, and provides the client devices 120 with the software that implements the secure communication modules 122 and the secure search modules 124. The secure communication infrastructure and the secure search infrastructure are implemented through the interactions of all these components.

It should be understood that although for simplicity FIG. 1 depicts only one organization system 110 and two client devices 120 for the communication server 100, there could be any number of each. For example, the communication server 100 could serve any number of organization systems 110, and each organization system 110 could have any number of users and client devices 120. There may likewise be multiple communication servers 100.

Note that since the cryptographic keys (at least conversation keys) of users are wrapped before being stored in the wrapped key repository 102 on the communication server 100, even though the communication server 100 stores the user keys, the communication server cannot access the actual unencrypted values of the keys. Hence, the communication server 100, even though acting as the facilitator of encrypted communications, need not be trusted by the users. For example, since the communication server 100 lacks access to the original unencrypted values of user cryptographic keys such as the conversation keys, the communication server cannot use the keys to obtain access to messages of the users that were encrypted using those conversation keys; that is, the user messages are undecipherable with respect to the communications server. Accordingly, there is no danger that employees of the communication server will abuse their privileged position to learn user secrets, or that the communication server itself could systematically read user conversations.

Example Interaction Sequence for Key Exchange and Secure Messaging

Figure 2:
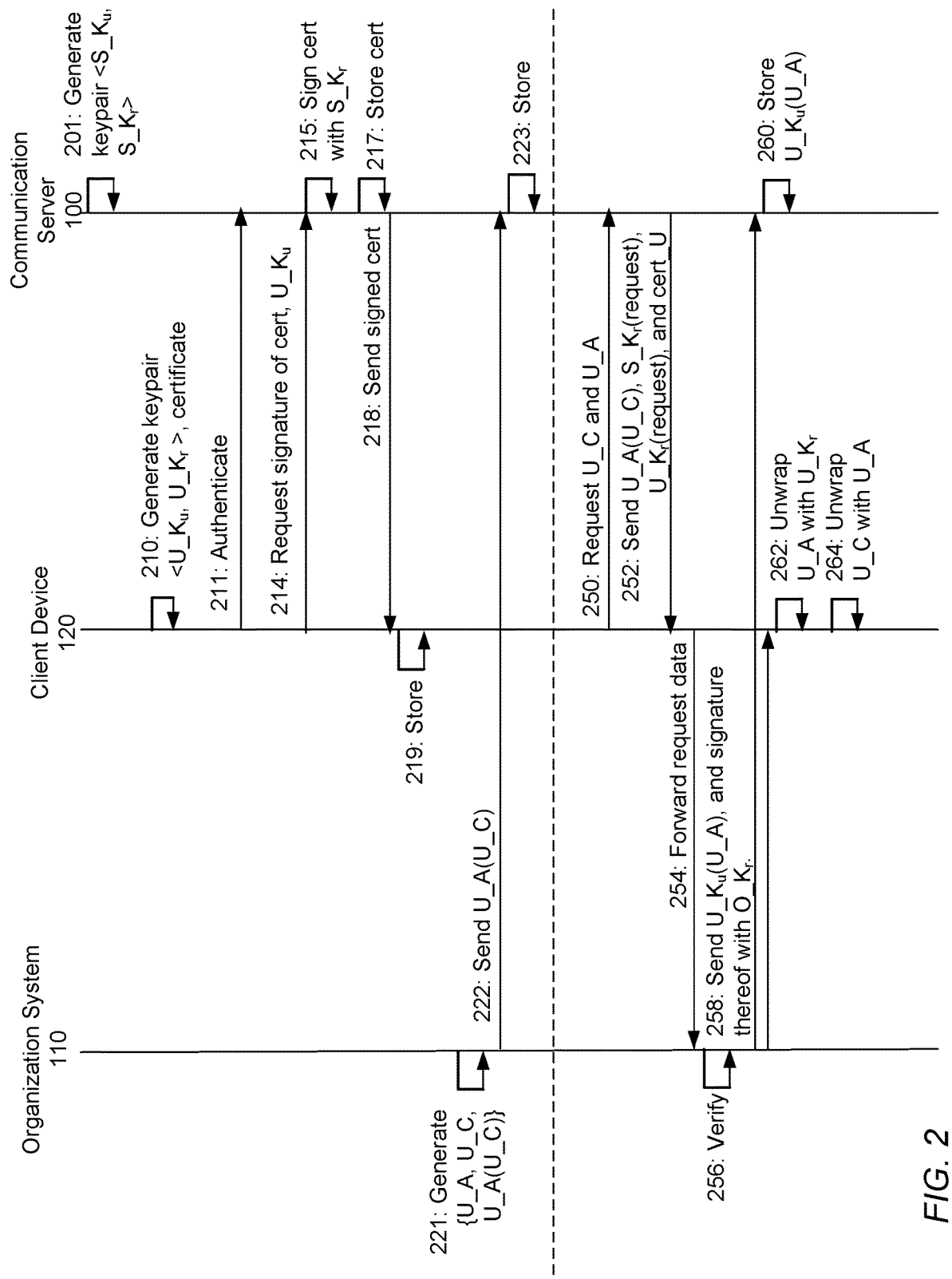
FIG. 2 is a sequence diagram illustrating interactions between the different entities of FIG. 1 as part of generating and exchanging cryptographic keys, according to one embodiment.

FIG. 2 is a sequence diagram illustrating interactions between the different entities of FIG. 1 as part of generating and exchanging cryptographic keys, according to one embodiment. FIG. 2 illustrates several distinct phases involved in a client device 120 ultimately obtaining a conversation key that will permit it to participate in a secure conversation with other client devices. In a preliminary phase including steps 210-219, a new user is registered, permitting the user to gain access to secure communications of the communicating organization. In a phase including steps 221-223, the organization system 110 generates the cryptographic keys for the new user. And in a phase including steps 250-264, the client device 120 of the user requests a conversation key so that it can communicate as part of a conversation with a particular set of other users included in the conversation.

Initially, the communication server 100 generates 201 a keypair consisting of a public key and private key, hereinafter referred to as $S\_K_u$ (server's public key) and $S\_K_r$ (server's private key, corresponding to the public key). The generation of $S\_K_u$ and $S\_K_r$ may be accomplished using algorithms such as RSA (Rivest-Shamir-Adleman), and need not occur frequently, e.g., only once.

In steps 210-219, a new user, using a client device 120, registers to use the organization system (or is registered by an administrator, for example). The new user's client device 120 generates 210 a keypair $U\_K_u$ (the new user's public key) and $S\_K_r$ (the new user's private key, corresponding to the public key) and a digital certificate for the new user that includes the public key $U\_K_u$.

In order to gain full access to communications, the new user establishes himself/herself with the communication server 100. Accordingly, the user's client device 120 (typically with input specified by the new user) authenticates 211 with the communication server 100, such as by providing a password or shared secret, or by using single sign-on (SSO). Assuming that the client device 120 successfully authenticates itself with the communication server 100 at step 211, the client device 120 then requests 214 that the communication server 100 sign the digital certificate that includes $U\_K_u$. The communication server 100 then signs 215 the digital certificate as requested, e.g., by applying a hash function to the digital certificate and applying its private key $S\_K_r$ to the resulting hash value. The signature serves as an indication that the communication server 100 vouches for the correctness of the digital certificate, including the binding of the new user to the new user's public key $U\_K_u$. The communication server 100 then stores 217 the signed digital certificate within its key repository 102 and sends 218 the signed certificate back to the client device 120, which likewise stores 219 the certificate in its local storage.

In steps 221-223, the organization system 110 of the communicating organization ensures that each of the users of the communicating organization has appropriate cryptographic keys for communication. Specifically, the organization system 110 generates 221, for each of the users of the communicating organization that has registered, or been registered by an administrator with the communication server 100—including, for example, the new user of steps 210-219—a user account key U_A, storing it in the user key repository 113. For each of the users, and for each of the established conversations of which the user is a member, the organization system 110 also generates 221 a conversation key U_C to use for cryptographic operations for that conversation. In one embodiment, the account key U_A and the conversation keys U_C for a user are re-generated at some preset time interval (e.g., daily), leading to a rotated set of account keys and conversation keys for that user, each key corresponding to a particular time period. Key rotation enhances security by ensuring that if the key is somehow obtained by an unauthorized party, it will only be usable for the particular time period to which it corresponds (e.g., a particular day). For each of the established conversations of which a user is a member, the organization system 110 encrypts the corresponding conversation key U_C with the user's account key U_A, thereby generating U_A(U_C)—that is, the key U_C, as encrypted using the key U_A. (The notation k(data) is employed herein as shorthand for f(k, data), where f( ) is a cryptographic transformation, such as encryption or decryption using symmetric-key algorithms such as AES256 (Advanced Encryption Standard, 256-bit), or signature/verification using asymmetric-key algorithms such as RSA, that transform the value data using the key k.) The organization system 110 sends 222 this encrypted conversation key for delivery to the communication server 100, which stores 223 the encrypted key in the user key repository 113 in association with the user and conversation. Note that since the key U_C, as well as U_A, is stored only on the organization system 110, with the communication server 100 storing only the encrypted key U_A(U_C), the communication server 100 does not have direct access to U_C (or U_A), and hence cannot use U_C to read the content of the user's encrypted conversations.

In steps 250-264, the user of a client device 120 obtains the user's current conversation key U_C for a particular conversation so that the user can participate in that conversation. (The user may need to obtain U_C, and U_A, after they have first been generated or rotated by the organization system 110, for example; thereafter, the user's client device 120 can cache U_C and U_A while they remain valid, assuming that the client device 120 can retain state.) To this end, the user's client device 120 requests 250 the user's conversation key U_C by sending a message embodying the request ("mReq_U_C") to the communication server 100, along with $U\_K_r(mReq\_U\_C)$—the request as signed by the user—which verifies that the user is the source of the request. Further assuming that the user's client device 120 has not yet obtained U_A, the user's client device 120 additionally requests 250 the user's account key U_A by sending a message embodying the request ("mReq_U_A") to the communication server 100, along with $U\_K_r(mReq\_U\_A)$—the request as signed by the user.

The communication server 100, which previously stored the encrypted conversation key, U_A(U_C), verifies the request mReq_U_C as coming from the user by verifying the signature $U\_K_r(mReq\_U\_C)$ using the user's public key, $U\_K_u$, which it had stored at step 217 as part of the digital certificate. Assuming that verification is successful, the communication server 100 sends 252 the value U_A(U_C) for delivery to the client device 120.

However, given the assumption that the client device 120 has not yet obtained U_A, the client device cannot obtain U_C from the value U_A(U_C). Accordingly, in response to mReq_U_A, the communication server 100 also sends 252, for delivery to the client device 120, the values $S\_K_r(mReq\_U\_A)$ and $U\_K_r(mReq\_U\_A)$—the request for U_A as signed by the communication server 100 and by the user, respectively. The communication server 100 also sends cert_U, the certificate of the user that it signed at step 215 and stored at step 217. The client device 120 then forwards 254 these data to the organization system 110.

Upon receipt of the data from step 254, the organization system 110 verifies 256 that the requests are indeed from the communication server 100 by applying the well-known public key of the communication server, $S\_K_u$, to the received signature $S\_K_r(mReq\_U\_A)$ and ensuring that the result matches the received request mReq_U_A. Similarly, the organization system 110 verifies 256 that the requests originated from the user by applying the public key of the user, $U\_K_u$, to the received signature $U\_K_r(mReq\_U\_A)$ and ensuring that the result matches the received request mReq_U_A. (If the organization system 110 does not already have $U\_K_u$, $U\_K_u$ may in turn be obtained from the certificate cert_U, after the organization system 110 verifies cert_U by verifying the signature of the communication server 100 on cert_U.)

If the verification of step 256 is successful, the organization system 110 has established that the request for U_A did indeed originate with the user. Accordingly, the organization system 110 obtains the account key U_A for the user from the user key repository 113, encrypting it so that only the user can obtain it by applying the user's public key to produce $U\_K_u(U\_A)$. The organization system 110 also signs the encrypted key with its own private key, $O\_K_r$, producing the value $O\_K_r(U\_K_u(U\_A))$. (For simplicity of explanation, it is assumed that the communications server 100 has previously obtained the public key $O\_K_u$, corresponding to the private key $O\_K_r$.) The organization system 110 sends 258 the values $U\_K_u(U\_A)$ and $O\_K_r(U\_K_u(U\_A))$ to the communication server 100, and also (either directly, or via the communication server 100) to the client device 120.

The communication server 100 verifies that the value $U\_K_u(U\_A)$ came from the organization system 110 by applying $O\_K_u$ to the signed $O\_K_r(U\_K_u(U\_A))$, storing 260 the value $U\_K_u(U\_A)$ if verification is successful. With $U\_K_u(U\_A)$ stored, the communication server 100 can in the future provide it directly, omitting steps 252-258, should a client device 120 again request U_A during the time period in which U_A is still valid, such as when obtaining conversation keys U_C for other conversations.

After obtaining $U\_K_u(U\_A)$ from the organization system, the client device 120 unwraps 262 U_A by applying its own private key, $U\_K_r$, to $U\_K_u(U\_A)$, and then unwraps 262 U_C by decrypting U_A(U_C), which it received at step 252, with U_A.

At this point, the client device 120 has the user's conversation key, U_C, for the desired conversation. The user can accordingly send and receive messages in the conversation, and the client device 120 can encrypt and decrypt the messages using U_C, as is now illustrated in FIG. 3.

It is understood that although FIG. 2 illustrates the operations occurring in a particular order, other variations are possible. For example, certain operations are performed in FIG. 2 so as to avoid the communication server 100 directly communicating with the organization system 110, since many administrators of such systems 110 prefer to avoid direct server-to-server connections. For organization systems 110 not prohibiting server-to-server communications, certain of the communications illustrated in FIG. 2 could be delivered directly by the communication server 100 to the organization system 110 without using the client device 120 as an intermediary, for example.

Figure 3:
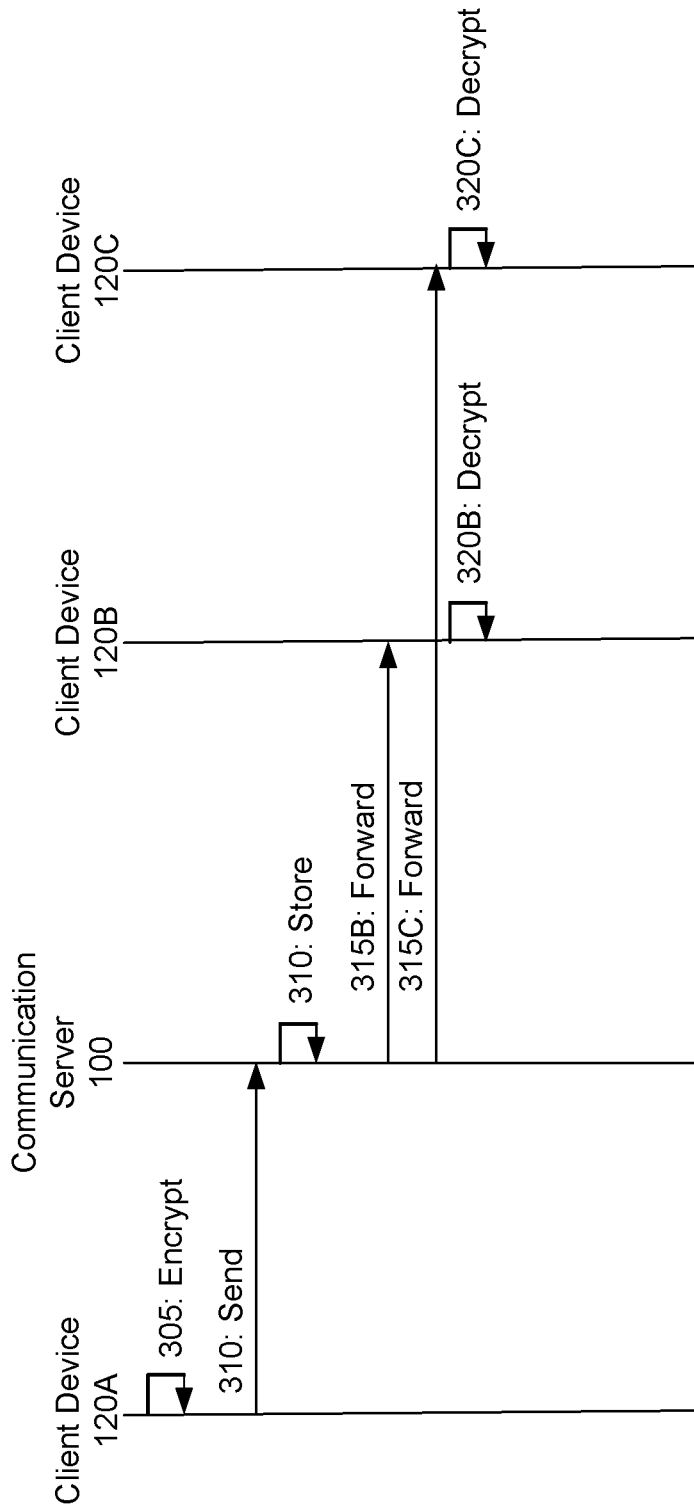
FIG. 3 illustrates interactions of the communication server and client devices of FIG. 1 when exchanging a message as part of a conversation, according to one embodiment.

FIG. 3 illustrates interactions of the communication server 210 and client devices 120 when exchanging a message as part of a conversation, according to one embodiment.

In the example scenario illustrated in FIG. 3, the devices 120A-C belong to three corresponding users (A, B, and C) who are registered with the organization system 110, and there is a conversation "Project X negotiations" defined in the conversations repository 104 for which users A, B, and C are the listed participants. Further assume that the client devices 120 have previously obtained the conversation keys for their respective users, e.g., as a result of the operations illustrated in FIG. 2.

When user A has composed a message to communicate as part of the conversation "Project X negotiations" and has specified that it should be sent, the client device 120A (via its secure communication module 122) encrypts 305 the message using the conversation key U_C previously obtained for that conversation. The client device 120A then sends 310 the encrypted message to the communication server 100.

The communication server 100 stores 310 the encrypted message as part of the messages for the conversation in the conversations repository 104. Since the message is encrypted with U_C, the original value of which can be accessed only by the organization system 110 and (as a result of the operations of FIG. 2) by the client 120A, the communication server 100 does not have access to the original plaintext of the message. The communication server 100 identifies the participant users in the conversation by consulting the metadata in the conversations repository 104, determines that user B and user C are also participants in the conversation, and accordingly forwards 315 the encrypted message to client devices 120B and 120C. Upon receipt of the encrypted message, the client devices 120B and 120C decrypt 320 the message into plaintext using their own conversation keys U_C, which they likewise obtained through operations like those in FIG. 2, and further display the decrypted messages. Users B and C can then respond with their own messages in a similar fashion to those in steps 305-320.

Example Flows for Decrypting Messages

Figure 4A:
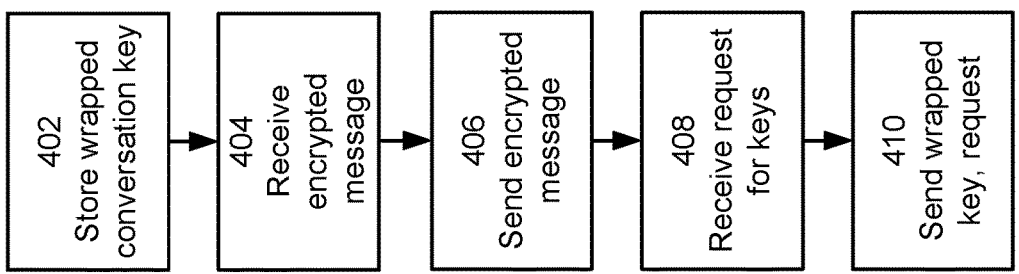
FIG. 4A is a flowchart illustrating steps performed by the communication server of FIG. 1 as part of the exchanging of messages and of data that allow the clients devices to decrypt the messages, according to one embodiment.

FIG. 4A is a flowchart illustrating steps performed by the communication server 100 of FIG. 1 as part of the exchanging of messages and of data that allow the client devices 120 to decrypt the messages into plaintext, according to one embodiment.

The communication server 100 stores 402 a wrapped version of a conversation key, as described with respect to step 223 of FIG. 2. The wrapped version of the conversation key was generated at an organization system by encrypting the conversation key using an account key. The communication server 100 does not have the account key in unencrypted form, and hence cannot obtain the unwrapped conversation key.

The communication server 100 receives 404 an encrypted message from a first client device as part of a conversation, e.g., as described with respect to step 310 of FIG. 3, where the communication server receives an encrypted message from the client device 120A. The message was encrypted by the first client device using the conversation key and is undecipherable to the communication server 100. The communication server 100 then sends 406 the encrypted message for delivery to a second client device, e.g., as described with respect to step 315B of FIG. 3, where the communication server forwards the encrypted message to the client device 120B.

When the second client device 120 decrypts the message, if it does not already have the conversation key for the conversation of which the encrypted message is a part, the communication server 100 receives 408 a request for cryptographic keys (i.e., the conversation key, and an account key used to encrypt the conversation key into the wrapped version) from the second client device 120 over the network 140, e.g., as described with respect to step 250 of FIG. 2. Accordingly, the communication server 100 sends 410 the wrapped version of the conversation key for delivery to the second client device, and sends the request for the account key for delivery to the organization system, e.g., as described with respect to step 252 of FIG. 2.

If the organization system 110 verifies the request, it will send the account key (in encrypted form decryptable by the user corresponding to the account key) to the second client device. Using the account key, the second client device can obtain the conversation key, and use the conversation key to decrypt the message and display it in unencrypted form to the user of the second client device.

Figure 4B:
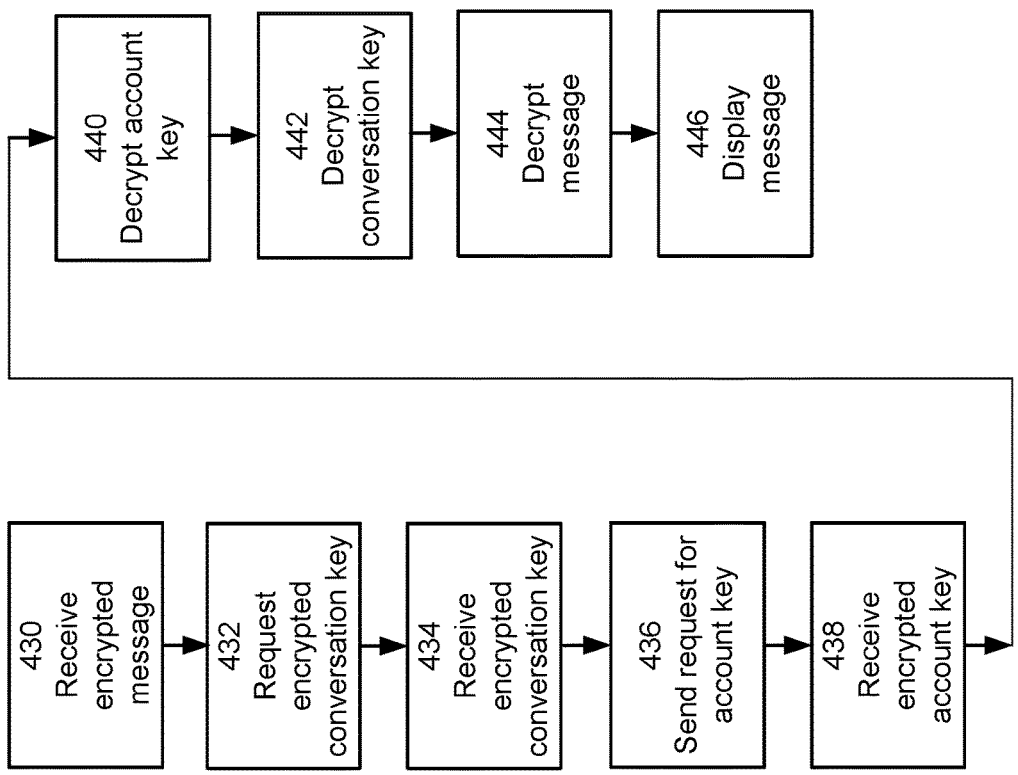
FIG. 4B is a flowchart illustrating steps performed by a client device of FIG. 1, such as the client device of FIG. 3, as part of decryption of a message, according to one embodiment.

FIG. 4B is a flowchart illustrating steps performed by a client device 120 of FIG. 1, such as the client device 120B of FIG. 3 or the second client device mentioned with respect to FIG. 4A, as part of decryption of a message, according to one embodiment.

The client device 120 receives 430 an encrypted message from another client device 120, e.g., as described with respect to step 315B of FIG. 3. The message is encrypted with a conversation key, and hence the recipient client device needs the conversation key to decrypt the message.

The client device 120 requests 432 the conversation key from a communication server 100 and receives the conversation key in encrypted form, e.g., U_A(U_C), as described with respect to steps 250 of FIG. 2.

Assuming that the client device 120 does not yet have the account key of its user, U_A, it cannot obtain U_C in plaintext form. Accordingly, the client device sends 436 a request for the account key U_A, e.g., as described with respect to step 252 of FIG. 2, and the request is ultimately delivered to an organization system 110, which verifies the request.

Assuming that the organization system 110 successfully verified the request for U_A, the organization system sends U_A to the client device 120, encrypted with the public key $U\_K_u$ of the user of the client device 120. The client device 120 receives 438 the encrypted account key U_A, and decrypts 440 U_A, e.g., as described with respect to step 262 of FIG. 2. Likewise, the client device 120 decrypts 442 the conversation key U_C, e.g., as described with respect to step 264 of FIG. 2.

The client device 120 then decrypts 444 the message using the conversation key 444. The client device 120 can then display 446 the message to the user in a user interface.

The steps of FIGS. 4A and 4B may be performed in a different order than those depicted, as well. For example, the communication server 100 may perform steps 408 and 410 of FIG. 4A before the encrypted message is received at step 404. As another example, the client device 120 may perform steps 432-444 of FIG. 4B before step 430.

Secure Search Infrastructure

Figure 5A:
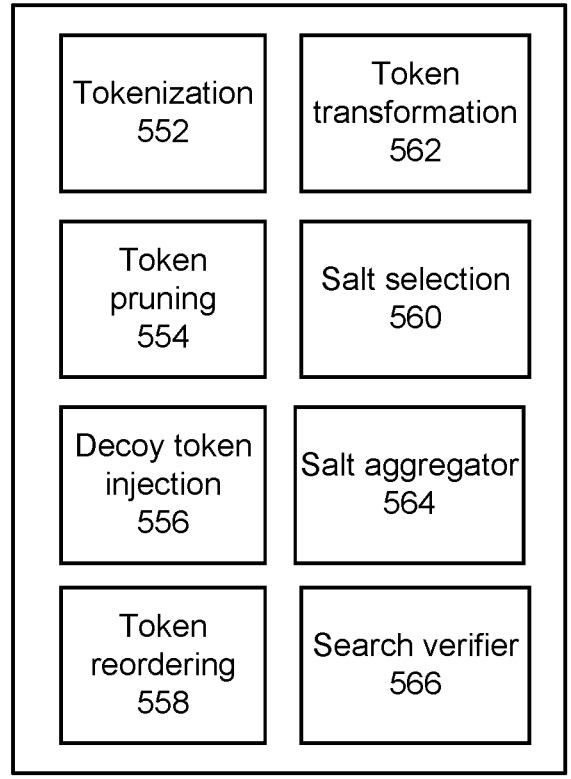
FIGS. 5A and 5B respectively illustrate secure search modules of the client devices and communication server of FIG. 1, according to one embodiment.
Figure 5B:
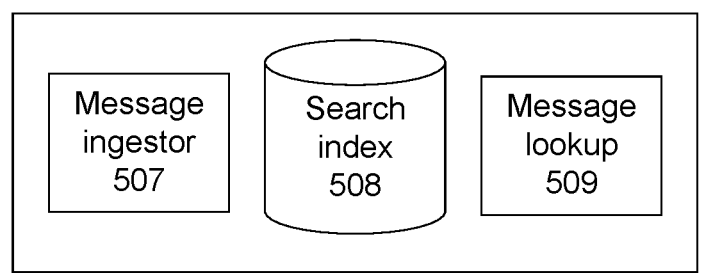

FIGS. 5A and 5B respectively illustrate components of the secure search module 106 of the communication server 100 and of the secure search modules 124 of the client devices 120, according to one embodiment. Together, the secure search modules 106 and 124 implement secure search functionality that allows users of client devices 120 to search the (encrypted) messages that they have exchanged with other users via the communication server 100, without the communication server 100 or unauthorized third parties being able to discover meaningful information from the searches themselves.

FIG. 5A illustrates the secure search module 124 of the client devices 120. The secure search module 124 includes a number of modules that enable a client device 120 to produce transformed tokens from text (e.g., a user message, or user search for matching messages). The transformed tokens allow users to perform secure searches on the communication server 100 without revealing information about user intent to the communication server or unauthorized third parties.

The secure search module 124 includes a tokenization module 552 that converts text to a sequence of tokens.

Tokenization may be performed in any manner that results in semantically meaningfully units for use as tokens. For example, in one embodiment, the tokenization splits the text on whitespace, resulting in a set of words that are used as tokens. For instance, as a simple example, a user might send the message "Please send me the project schedule so that we can verify the scheduling", for which the tokens would be the words "Please", "send", "me", "the", "project", "schedule", "so", "that", "we", "can", "verify", "the", and "scheduling".

The secure search module 124 also includes a token pruning module 554 that removes tokens not likely to have semantic value for characterizing the message. In one embodiment, the token pruning module 554 removes stopwords that are common and not likely to convey significant meaning, such as "a", "the", "to", and the like. In one embodiment, the token pruning module 554 performs linguistic stemming, substituting the stem version of a token for the token's original value (e.g., substituting the stem "schedul" for both "schedule" and "scheduling"). In one embodiment, message searches do not distinguish between messages based on how many times the tokens occur in the messages (as long as they occur at least once), and accordingly the token pruning module 554 removes duplicate tokens from the set of tokens (e.g., removing the duplicate "the" and stemmed "schedul" in the example above). Stemming and pruning also serve to thwart any token frequency analysis that an unauthorized third party might perform.

The secure search module 124 additionally includes a decoy token injection module 556 that augments the token set with a set of additional "decoy" tokens that are generated independent of the user's text, rather than obtained from the text itself. This results in a hybrid set of tokens containing both original tokens and decoy tokens. The decoy tokens are selected to be believable tokens that could conceivably be part of the user's search. Many different techniques for selecting the decoy tokens can be employed. In one embodiment, the decoy token injection module 556 has a dictionary of common message tokens known to be terms commonly found in messages (e.g., in a certain percentage of messages), along with their respective probabilities of occurrence (e.g., as previously determined by analysis of some corpus of textual documents, or in some embodiments, but analysis of the messages from the current conversation). In this embodiment, the decoy token injection module 556 selects tokens from the dictionary so as to negate any information that could be gained by an unauthorized third party using the probabilities. In one embodiment, there is a separate dictionary and corresponding probabilities of occurrence for different parts of speech, such as verbs, nouns, pronouns, adjectives, and the like. In one embodiment, a decoy token salt is derived from the conversation salt is used to hash integers generated randomly based on a closed form of a cumulative probability distribution for the dictionary.

To further thwart the ability of unauthorized third parties to infer information about text (a message or a search) based on the text's corresponding tokens, the secure search module 124 includes a token reordering module 558 that randomizes or otherwise changes the order of the tokens corresponding to the text so that they do not remain in the same order that they were originally extracted from the text. This eliminates the ability of the unauthorized third parties to analyze textual word ordering to infer information about the text based on, e.g., known grammatical patterns. The reordering is in addition to the operations already mentioned above, such as the removal of duplicate tokens.

The secure search module 124 additionally includes a token transformation module 562 that transforms the textual tokens into a different form from which the original token is not directly derivable. In one embodiment, the transformation used by the token transformation module 562 is a one-way function whose inverse cannot be readily computed, such as hash function such as SHA-256 (Secure Hash Algorithm with 256-bit blocks). Since the transformation is a one-way function, the original value of a token cannot be readily derived based solely based on the transformed token.

To further increase the difficulty for a non-authorized third-party to guess the original value of a token based on its transformed token, the token transformation module 562 may further compress the value of the transformation output. For example the SHA-256 hash function produces 256-bit/32-byte output, but the token transformation module 562 may further truncate or otherwise reduce the output to some smaller amount of data, such as four bytes. This increases the number of collisions (different inputs with the same output), which makes it still more difficult to derive the original token input from the transformed token output. However, the increased number of hash collisions tends to result in false positive message matches—that is, messages having transformed tokens matching a user search, even though the user search terms are not actually within the original message text—which necessitates more work on the part of the client devices 120 to screen out the false positives. Thus, in one embodiment the organization responsible for the organization system 110, or its individual users, may configure the degree to which the token transformation module 562 further compresses the transformed tokens.

Even when tokens are transformed, if the same transformation is applied to all tokens, then tokens with the same original value will have the same transformed value. Accordingly, an unauthorized third party would be able to tell from the transformed tokens that (for example) different conversations are discussing similar topics, based on the fact that the transformed tokens are generally similar, even though the unauthorized third-party could not determine the meaning of the individual transformed tokens.

Accordingly, in one embodiment the secure search module 124 includes a salt selection module 560 that selects different salts to achieve different transformations for different messages. The salts are values, not derived from text of the tokens themselves, that effectively increase the number of possible transformations for a token and hence make it more difficult to obtain the original token from a transformed token. The salt selection module 560 may use different techniques in different embodiments, and in some embodiments the users may specify parameters that control the selections of the salt selection module.

In some embodiments, the salt selection module 560 bases salt selection at least in part upon time ("temporal salt isolation"). More specifically, the salt selection module 560 associates each salt with a particular time period during which it will be used. As a result, if a particular salt is somehow discovered or otherwise compromised by an unauthorized third party, then it can be applied only during its associated time period, thereby temporally limiting the security risk. For example, the salt selection module 560 might randomly periodically generate a pool of possible salts to be used during some particular period (such as a 24-hour period). Thus, if a first salt is used to transform tokens for a particular 24-hour period, and a second salt is used to transform tokens for the next 24-hour period, then if an unauthorized third party manages to obtain the first salt, although it may be able to obtain the original values of tokens for the first 24-hour period, it will still not be able to obtain the original values of the tokens for the second 24-hour period.

In some embodiments, the salt selection module 560 bases salt selection at least in part upon identities of the current users or messages ("spatial salt isolation"). For example, the salt selection module 560 may select salt values as a function of the current user, the current conversation in which the user is participating when sending the message, the security level of the conversation, or the like. Thus, if an unauthorized third-party discovers the salt used for a particular "spatial domain" (e.g., user, conversation, security level, or some combination thereof), that particular salt will not be applicable to other spatial domains. Accordingly, spatial salt isolation, like temporal salt isolation, limits the potential damage caused by unauthorized third parties discovering salt values, and hence further increases the security of the system.

As one specific example of salt selection for a message, the salt selection module 560 could be configured to use the same salt for all the tokens of the message, selecting the salt from a pool of 1000 possible salt values for the current time period by computing a numerical hash value of the ID of the conversation to which the message belongs, computing the modulo 1000 value of the hash value, and selecting the corresponding salt by indexing into the set of the 1000 possible salts using the module 1000 value.

Having a greater number of possible salts that may be picked tends to increase the security of the system but to correspondingly increase the computational overhead required to implement it. Thus, in some embodiments, some fixed set of N possible salts is chosen (e.g., randomly generated) for each time period, and one of those possible salts is selected for use with each of the spatial domains. (If N is smaller than the number of spatial domains, then the same salt may be used for multiple spatial domains.)

The salt selection module 560 stores the salts that were potentially selectable, or actually selected, for later use when performing a secure search. For example, in embodiments in which a set of N salts is chosen for potential use during a given time period, the salt selection module 560 stores that set of salts in association with the time period.

In one embodiment, the secure search module 124 includes a salt aggregator module 564 that assembles a list of all the potential salts that could have been used to produce transformed tokens for messages to which a searching user has access. In the context of a user searching for messages with given search tokens, the messages that the user can search may belong to many different spatial and temporal domains, such as having been delivered in different conversations or with different security levels (examples of spatial domains), or having been sent at different times (temporal domain). Since the user's search only specifies search tokens to search for, and does not specify the particular spatial and/or temporal domains to search, the messages to search may belong to any combination of the different possible spatial and temporal domains. Accordingly, the search tokens for the search are transformed with each of the many different salts selected by the salt selection module 560 for these different spatial and temporal domains, and each of the differently-transformed search tokens are searched for in the conversations repository 104.

For example, if there have been M temporal domains since the searching user started using the system (or since the beginning of a search period that the searching using is allowed to search), each temporal domain having N possible salts for the various spatial domains to which the user has access, then there are MN total possible salts using which the user's secure search module 124 may have produced transformed tokens. The salt aggregator module 564 accordingly identifies all of the MN possible salts. In other embodiments, in order to reduce the number of possible salts to be tested, the salt selection module 560 keeps a list of which possible salts it has actually selected, and the salt aggregator module 564 identifies only this set of salts. In some embodiments, a search interface provided to the user by the secure search module 124 allows the user to specify a subset of all possible and temporal domains to search, e.g., only searching messages from given conversations, or only searching for messages sent during certain periods of time. Using the list of possible salts identified by the salt aggregator, the secure search module 124 assembles an aggregate list of all possible transformed tokens to search for. If there are P total search tokens corresponding to the user search, and Q possible salts identified by the salt aggregator module 564, then there are PQ total transformed tokens to test.

In some embodiments, functionality described above as the salt selection module 560 and salt aggregator module 564 is instead performed on the organization system 110, with the salt selection module 560 and salt aggregator module 564 of the secure search module 124 of the client device 120 merely receiving the salts from the organization system. In these embodiments, the key generation module 111 of the organization system 111 generates the possible salts for the various temporal and/or spatial domains, and operations of the organization system 110, communication server 100, and client devices 120 (via their secure communication modules 105, 115, and 122) securely distribute the salts to the requesting modules 560, 564 of the client device 120. For example, in some embodiments the organization system 110 sends U_A(salts) as part of step 222 of FIG. 2, where "salts" represents the possible salts generated for the current time period; the client request 250 to the communication server 100 includes a request for the possible salts for the current time period; the communication server includes the value U_A(salts) as part of step 252; and the client device 262 unwraps the possible salts using U_A. Using this salt distribution system, different client devices 120 can share the same salts if they are part of the same conversations and hence search messages that originated at different client devices, for example.

As discussed above, due to the fact that the transformation applied by the token transformation module 562 may result in different tokens being transformed to the same transformed token, a user search may result in false positives, with the message lookup module 509 determining that various encrypted messages from the conversations repository 104 match the user's search, whereas in reality the messages do not contain tokens from the user's original search. For example, assuming that a user requests a search for messages matching the token "project", that both "project" and "penguin" are transformed to the same value, and that the conversations repository 104 contains a message by the user containing the term "penguin" but not "project," the message lookup module 509 might (incorrectly) conclude that the message with the token "penguin" is a match for the search "project." In embodiments in which decoy tokens are injected into the tokens created for indexing purposes, false positives may also be created by matches on the decoy tokens.

To account for such false positive matches, the secure search module 124 includes a search verifier module 566 that determines whether the messages returned by the message lookup module 509 do, in fact, match the user's search term(s). After the secure communications module 122 has decrypted the returned messages, the search verifier module 566 analyzes the content of the returned messages to determine whether they include the search term(s). Since the number of messages returned by the message lookup module is likely to be computationally manageable (e.g., likely only 10-100 messages), the secure search module 124 can quickly analyze the content of those messages to filter out any "false positive" messages. Specifically, the search verifier module 566 receives the messages returned by the secure search module 106 of the communication server 100, decrypts them using the conversation key corresponding to their respective times of sending, compares the search tokens from the user's search to the tokens present in the decrypted messages, and identifies and filters out decrypted messages without a requisite degree of actual matches between the search tokens and the tokens present in the decrypted messages (e.g., each search term, or at least some given percentage thereof, being present in the decrypted messages).

FIG. 5B illustrates the secure search module 106 of the communication server 100. The secure search module 106 includes a search index 508 of transformed tokens correlated with documents from which they were derived, which allows the secure search module 106 to look up the messages from the conversations repository 104 that correspond to the search terms of the users' searches. In conventional systems in which previously-exchanged messages are saved in plaintext form, search functionality can examine the original text of the messages, or terms obtained directly from the original text. However, since the messages of the conversations store 104 are stored in encrypted form, and since the secure search functionality is designed not to allow the communication server 100 to discover meaningful information about the users' search intentions, the search index 508 stores information about the messages in transformed form. Specifically, as explained above, the secure search modules 124 of the client devices 120 apply transformations to the tokens (e.g., words) of messages at the time that the client devices 120 exchange the messages. As a result of the transformations, the original message text is no longer derivable from (transformed) tokens alone. The search index 508 correlates the transformed tokens with the messages from which they were derived. In one embodiment, the search index is organized as an inverted index, with transformed tokens acting as keys, each transformed token mapping to a list of messages from the conversations repository 104 from which the transformed token was derived.

The search index 508 is generated by a message ingestor module 507 as messages are received from by communication server 100 as part of conversations between client devices 120. Specifically, the communication server 100 receives encrypted messages from the client devices 120 and also receives—along with each encrypted message—a corresponding set of transformed tokens derived from the text of the message. The message ingestor module 507 stores the encrypted message in the conversations repository 104, generating a unique identifier for the message. The message ingestor module 507 also updates the search index 508 to correlate the transformed tokens with the message. In embodiments in which the search index 508 is an inverted index, the message ingestor module 507 creates or adds to an entry in the search index 508 for each transformed token, adding the unique identifier created for the message to the message list corresponding to each transformed token.

The secure search module 106 also includes a message lookup module 509 that responds to client searches for encrypted messages. Specifically, as explained in more detail below with respect to FIG. 5B, when a user performs a message search, the user's client device 120 sends transformed tokens that correspond to the user's specified search to the communication server 100. The message lookup module 509 then examines the search index 508, looking for entries with the transformed tokens as the key, and identifying certain ones of the encrypted messages as matches for the user's search based on the presence of the encrypted messages in entries' message lists. Different embodiments of the message lookup module 509 impose different requirements regarding which tokens must be present before a match is determined to have taken place between the transformed tokens and an encrypted message. For example, some embodiments require all the transformed tokens to correspond to the message (an "AND"); some embodiments require only one transformed token to correspond to the message (an "OR"); other embodiments require at least some threshold number of percentage of the transformed tokens to correspond to the message; other embodiments rank the messages based on what percentage of the transformed tokens correspond to them. The message lookup module 509 may further filter the set of messages deemed to match the user's search based on other criteria, such as removing any messages to which the searching user does not have access, e.g., messages that are part of conversations for which the user is not a participant. The message lookup module 509 sends the encrypted messages deemed to match the user's search (and to satisfy any other relevant criteria) to the client device 120 from which the search originated. The secure communication module 122 of the client device 120 can then decrypt the encrypted messages using the appropriate conversation key(s).

Example Interaction Sequence for Secure Search

Figure 6A:
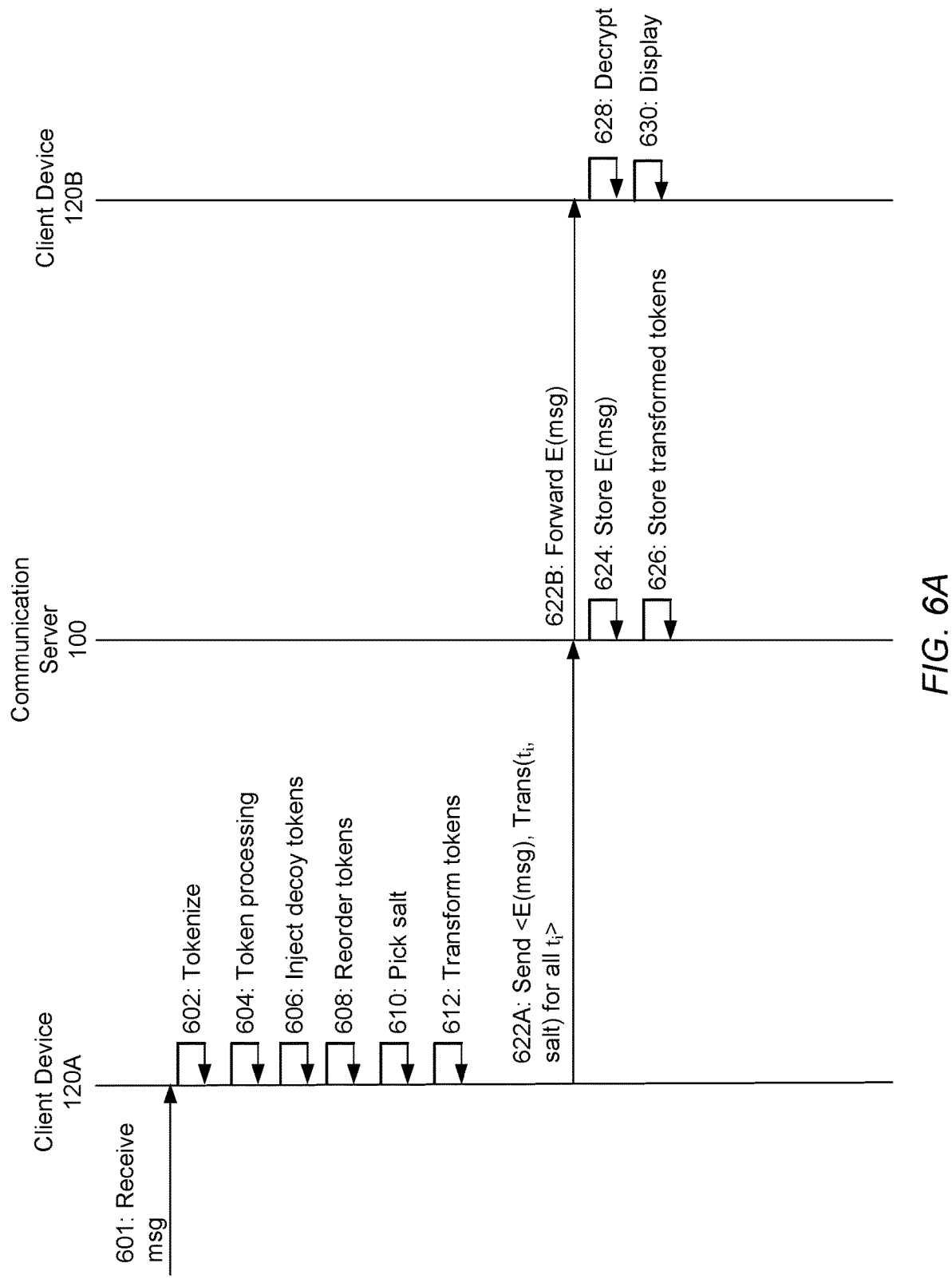
FIGS. 6A and 6B are sequence diagrams respectively illustrating operations when generating a search index and when searching for messages, according to one embodiment.

FIG. 6A is a sequence diagram illustrating interactions between the different entities of FIG. 1 as part of generating a search index 508, according to one embodiment. FIG. 6A is similar to FIG. 3 in that it takes place within the context of a first client device 120A sending a message to a second client device 120B. However, unlike FIG. 3, FIG. 6A focuses on the operations performed by the secure search modules 124 and 106 when ingesting a message for inclusion within the search index 508.

In a first step, a client device 120A receives 601 a message, msg, from a user to send to a second user on a second client device 120B, such as "Please send me the project schedule so that we can verify the scheduling."

The secure search module 124 tokenizes 602 the message, e.g., as described above with respect to the tokenization module 552, producing a set of tokens, such as the set of word tokens "Please", "send", "me", "the", "project", "schedule", "so", "that", "we", "can", "verify", "the", and "scheduling."

The secure search module 124 performs 604 token pre-processing on the set of tokens, e.g., as described above with respect to the token pruning module 554. Continuing the above example, stopword removal, stemming, and duplicate token removal might result in the set of tokens "Please", "send", "me", "project", "schedul", "we", "can", and "verify."

In one embodiment, the secure search module 124 injects 606 decoy tokens into the pre-processed set of tokens, e.g., as described above with respect to the decoy token injection module 556. This results in some set of decoy tokens that were not actually present in the message itself, which frustrates the ability of unauthorized third parties to perform frequency analysis to obtain some knowledge of what the message might contain. Continuing the above example, where the decoy tokens are denoted $D_i$ for purposes of example, the hybrid set of tokens might then be "Please", "send", "me", "project", "schedul", "we", "can", "verify", $D_1$, $D_2$, $D_3$, $D_4$, $D_5$, $D_6$, $D_7$, $D_8$, $D_9$, $D_{10}$, and $D_{11}$. In other embodiments, decoy tokens are not generated when sending messages, but only when handling a user search.

The secure search module 124 reorders 608 the tokens to further frustrate unauthorized third parties that might attempt to exploit grammatical or other linguistic patterns based on word order to obtain some degree of information about the message, e.g., as described above with respect to the token reordering module 558. Continuing the above example, the set of tokens might be reordered to "schedul", $D_9$, "me", $D_{11}$, $D_2$, "project", "can", "verify", $D_1$, "we", $D_5$, $D_7$, $D_6$, "send", $D_4$, $D_8$, "Please", $D_{10}$, and $D_3$.

The secure search module 124 picks 610 a salt value to use for the tokens, e.g., described above with respect to the salt selection module 560.

With the salt(s) selected, the secure search module 124 transforms 612 the tokens so that they cannot be read by unauthorized third parties, e.g., as described above with respect to the token transformation module 662. Continuing the above example, for a selected seed s, the set of tokens might be transformed to the values SHA-256("schedul", s), SHA-256($D_9$, s), SHA-256("me", s), SHA-256($D_{11}$, s), SHA-256($D_2$, s), SHA-256("project", s), SHA-256("can", s), SHA-256("verify", s), SHA-256($D_1$, s), SHA-256("we", s), SHA-256($D_5$, s), SHA-256($D_7$, s), SHA-256($D_6$, s), SHA-256("send", s), SHA-256($D_4$, s), SHA-256($D_8$, s), SHA-256("Please", s), SHA-256($D_{10}$, s), and SHA-256($D_3$, s).

The secure search module 124 sends 622A, to the communication server 100 for delivery to the client device 120B 610, both an encrypted form of the plaintext message, msg, and the set of transformed tokens. Continuing the above example, the secure search module 124 sends 622A the values E("Please send me the project schedule so that we can verify the scheduling")—where E(msg) represents the encrypted value of msg—and the corresponding set of transformed tokens, SHA-256("schedul", s), SHA-256($D_9$, s), SHA-256("me", s), SHA-256($D_{11}$, s), SHA-256($D_2$, s), SHA-256("project", s), SHA-256("can", s), SHA-256("verify", s), SHA-256($D_1$, s), SHA-256("we", s), SHA-256($D_5$, s), SHA-256($D_7$, s), SHA-256($D_6$, s), SHA-256("send", s), SHA-256($D_4$, s), SHA-256($D_8$, s), SHA-256("Please", s), SHA-256($D_{10}$, s), and SHA-256($D_3$, s).

The communication server 100 forwards 622B the encrypted message, E(msg), to the recipient client device 120B, and the client device 120B decrypts 628 E(msg) to obtain the original message msg, in a manner similar to steps 315B and 320B of FIG. 3, for example. The client device 120B can then display 630 msg to its user.

Also in response to receipt of the encrypted message and its corresponding transformed tokens, the communication server 100 stores 624 the encrypted message in the conversations repository 104, in a manner similar to step 310 of FIG. 3, for example. The communication server also stores 626 the transformed tokens and the message in the appropriate entries of the search index 508, e.g., as described above with respect to the message ingestor module 507.

At this point, the transformed tokens for msg have been placed into the search index 508, and so the message msg is ready to be securely searched.

Figure 6B:
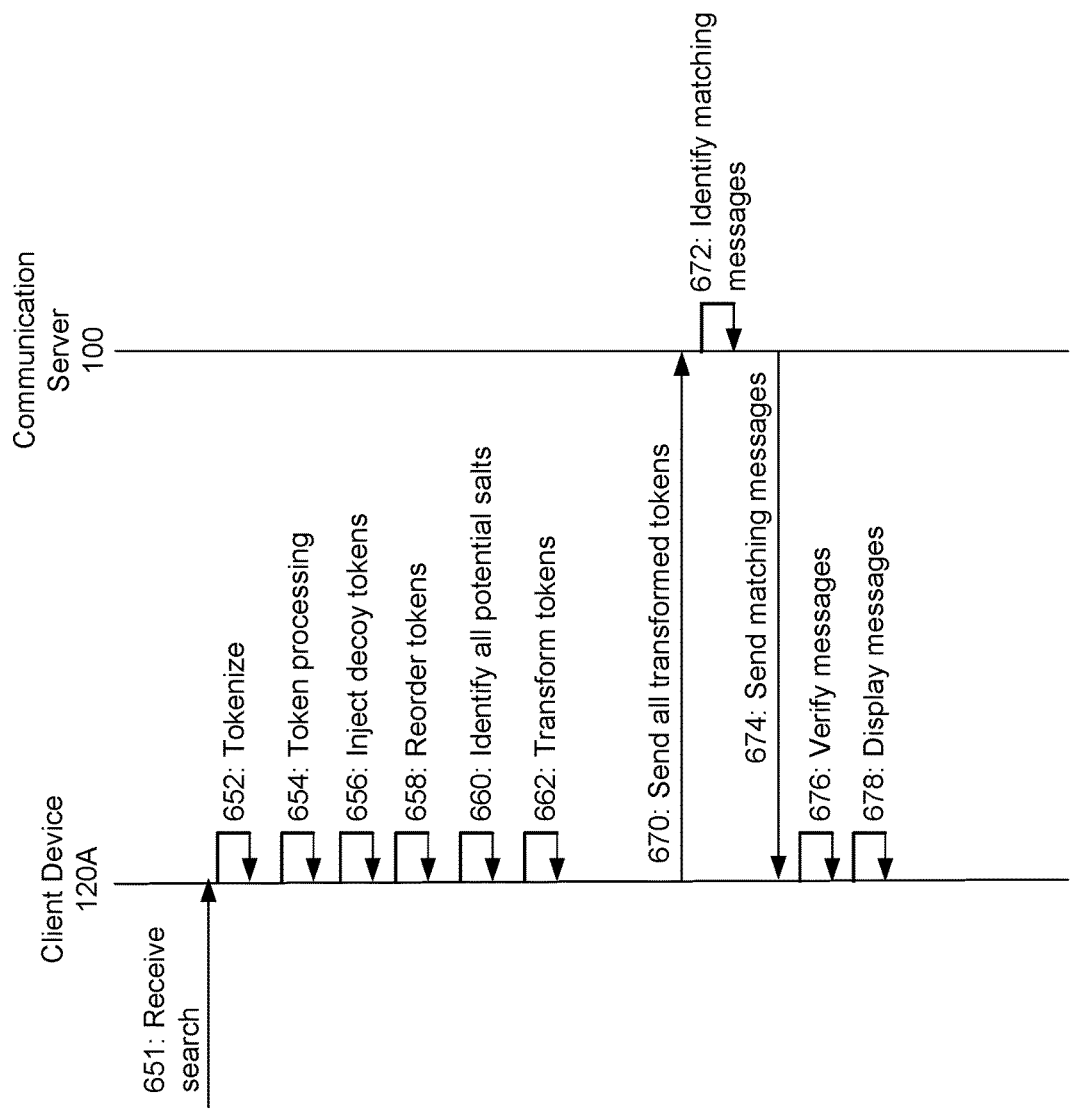

FIG. 6B is a sequence diagram illustrating interactions between the different entities of FIG. 1 as part of searching for a message using the search index 508, according to one embodiment.

Initially, the client device 120A receives 651 a search (e.g. a set of search tokens) from its user. Continuing the above example, assuming that the user wishes to find the messages that he has sent about project schedules, and so submits the search text "project schedules."

The secure search module 124 of the client device 120A goes through steps similar to those of FIG. 6A in order to transform the search tokens in a manner equivalent to those that transformed the message tokens in FIG. 6A. For example, the secure search module 124 tokenizes 652 the search text, e.g., producing the tokens "project" and "schedules." The secure search module 124 processes 654 the tokens, with stemming resulting in the modified set of tokens "project" and "schedul". In order to disguise the intent of the user's search from unauthorized third parties, the secure search module 124 injects 656 decoy tokens, e.g., the tokens $D_5$, $D_{12}$, $D_{13}$, $D_{14}$, and $D_{15}$, resulting in the token set. The secure search module 124 then reorders 658 the tokens, producing, for example, the ordered set of tokens $D_{13}$, "project", $D_5$, $D_5$, $D_{12}$, $D_{14}$, $D_{12}$, and "schedul".

The secure search module 124 identifies 660 a list of all the possible salts for transforming the search tokens. As discussed above with respect to the salt aggregator module 564, if the salt aggregator module identifies Q possible salts that may have been used in the past when transforming tokens for message to which the searching user has access, and the search has P associated tokens, then there are PQ total ways to transform the tokens. Continuing the above example, there are 8 search tokens (i.e., P=8), and assume that there are 1000 possible salts that may have been used in the past. Then there are 8000 token transformations to perform: 1000 variants for each of the 8 search tokens, corresponding to the 1000 possible salts, each of which may have been used to transform the token when a message containing the token was sent.

The secure search module 124 transforms 662 all of the possible search token/salt combinations by applying the same transformation T as described above with respect to the token transformation module 562. The secure search module 124 sends 670 all of the transformed token/salt combinations for delivery to the communication server 100.

The communication server 100 identifies 672 all of the messages that match, e.g., as described above with respect to the message lookup module 509, where the set of all transformed token/salt combinations from step 662 serve as the set of transformed tokens to search for in the search index 508.

The communication server 100 sends 674 the set of matching messages for delivery to the client device 120A. Upon receipt of the messages, the secure search module 124 of the client device 120A may verify 676 that each of the messages does, in fact, truly match the search, e.g., as described above with respect to the search verifier module 566, filtering out any messages that do not truly match. The secure search module 124 may display 678 the (e.g., verified) messages to the user in a user interface (e.g., not displaying the non-verified messages).

It is appreciated that the particular order of operations described in FIGS. 6A and 6B could be varied in different embodiments. As just one example, the tokens could be reordered 608 after the tokens have been transformed at step 612 in FIG. 6A.

Example Computer Architecture

Figure 7:
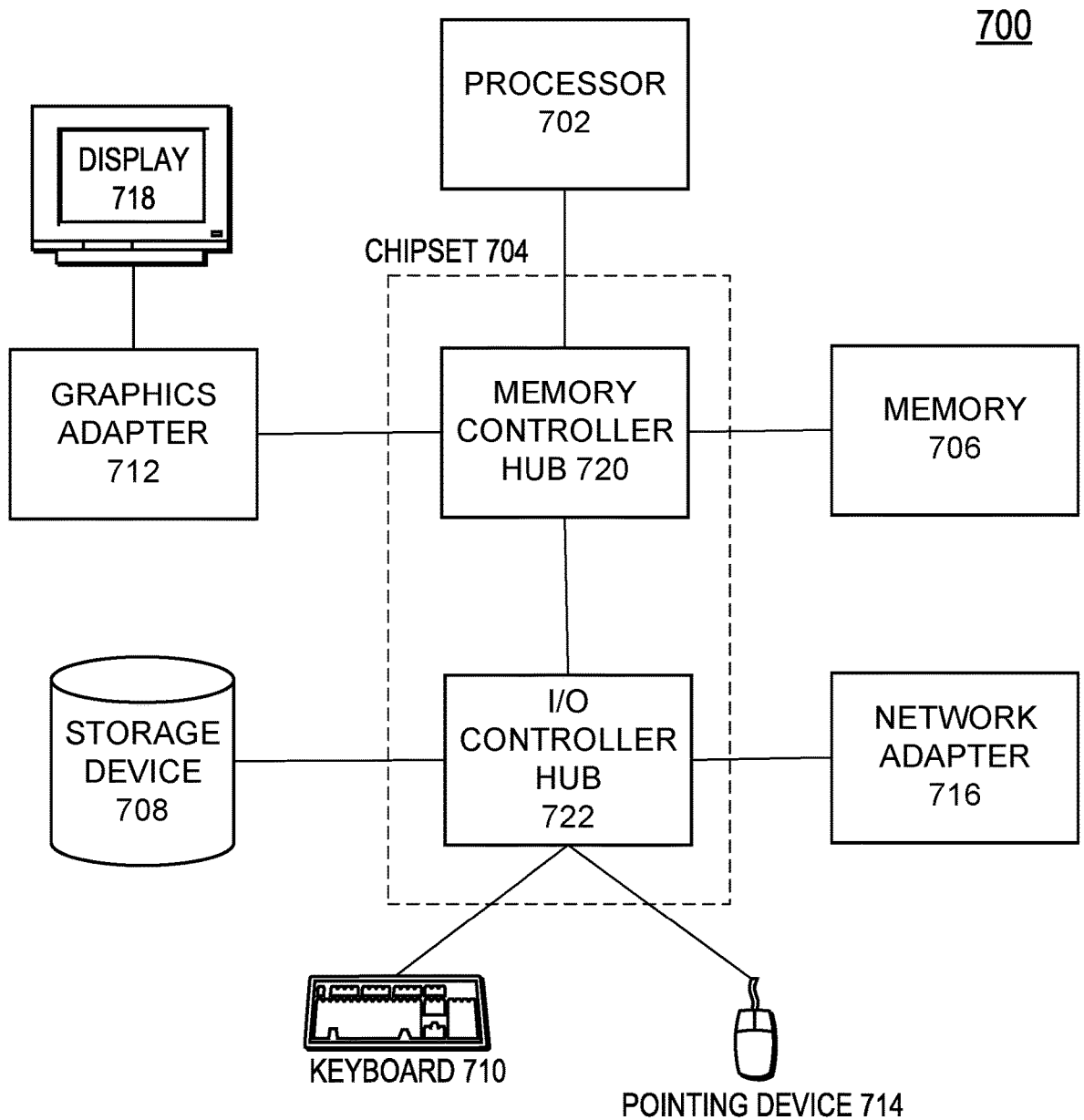
FIG. 7 is a high-level block diagram illustrating physical components of a computer used as part or all of the communication server, organization system, or client device from FIG. 1, according to one embodiment.

FIG. 7 is a high-level block diagram illustrating physical components of a computer 700 used as part or all of the server 100, system 110, or client device 120 from FIG. 1, according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD (Digital Versatile Disc), or a solid-state memory device. The memory 706 holds instructions and data used by the processor 702. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

OTHER CONSIDERATIONS

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by a client device, the method comprising:
    receiving search text from a user;
    tokenizing the search text into a set of tokens;
    identifying, by a salt selection module of the client device, a plurality of possible salt values for the set of tokens, the plurality of possible salt values comprising at least one of: a plurality of salt values corresponding to different time periods, or a plurality of salt values derived from user identities, message identities, or conversation identities;
    generating, by a token transformation module of the client device, a plurality of possible token sets by, for each possible salt value of the plurality of possible salt values, transforming the set of tokens using the possible salt value; and
    sending the plurality of possible token sets to a communication server for identification of matching messages from a plurality of messages stored in encrypted form by the communication server,
        wherein the communication server comprises a search index comprising at least one transformed token corresponding to each message from the plurality of messages, and
        wherein the at least one transformed token was derived by transforming at least one token from the corresponding message using a selected salt value from the plurality of possible salt values.

2. The computer-implemented method of claim 1, further comprising:
    receiving from the communication server a set of encrypted messages matching the plurality of possible token sets;
    decrypting the encrypted messages into plaintext messages;
    comparing tokens of the search text to contents of the plaintext messages; and
    based on the comparing, identifying plaintext messages having a given requisite degree of matches between the tokens of the search text and the contents of the plaintext messages.

3. The computer-implemented method of claim 1, further comprising:
    generating a set of decoy tokens that are independent of text of the search text; and
    including the decoy tokens as part of the plurality of possible token sets sent for delivery to the user.

4. The computer-implemented method of claim 1, further comprising changing orders of the tokens.

5. The computer-implemented method of claim 1, wherein the selected salt value is selected based on a current time period.

6. The computer-implemented method of claim 1, wherein the selected salt value is selected based on identities of users or messages.

7. The computer-implemented method of claim 1, further comprising:
    selecting, for each time period of a plurality of time periods, a plurality of possible salts for the time period;
        wherein the selected salt value is selected from one of the possible salts for a time period containing a time of the sending of the encrypted message.

8. The computer-implemented method of claim 2, further comprising displaying, to the user, the plaintext messages having the given requisite degree of matches.

9. The computer-implemented method of claim 3, wherein the decoy tokens are generated using a dictionary of common message tokens.

10. The computer-implemented method of claim 6, wherein the selected salt value is selected based on a user sending the message or a user receiving the message.

11. The computer-implemented method of claim 6, wherein the selected salt value is selected based on a conversation to which the message belongs.

12. The computer-implemented method of claim 6, wherein the selected salt value is selected based on a security level of a conversation to which the message belongs.

13. A non-transitory computer-readable storage medium storing instructions executable by a processor of a client device, the instructions when executed by the processor performing actions comprising:
    receiving search text from a user;
    tokenizing the search text into a set of tokens;
    identifying, by a salt selection module of the client device, a plurality of possible salt values for the set of tokens, the plurality of possible salt values comprising at least one of: a plurality of salt values corresponding to different time periods, or a plurality of salt values derived from user identities, message identities, or conversation identities;
    generating, by a token transformation module of the client device, a plurality of possible token sets by, for each possible salt value of the plurality of possible salt values, transforming the set of tokens using the possible salt value; and
    sending the plurality of possible token sets to a communication server for identification of matching messages from a plurality of messages stored in encrypted form by the communication server,
        wherein the communication server comprises a search index comprising at least one transformed token corresponding to each message from the plurality of messages, and
        wherein the at least one transformed token was derived by transforming at least one token from the corresponding message using a selected salt value from the plurality of possible salt values.

14. The non-transitory computer-readable storage medium of claim 13, the instructions further comprising:
    instructions for receiving from the communication server a set of encrypted messages matching the plurality of possible token sets;
    instructions for decrypting the encrypted messages into plaintext messages;
    instructions for comparing tokens of the search text to contents of the plaintext messages; and
    instructions for, based on the comparing, identifying plaintext messages having a given requisite degree of matches between the tokens of the search text and the contents of the plaintext messages.

15. The non-transitory computer-readable storage medium of claim 13, the actions further comprising:
    generating a set of decoy tokens that are independent of text of the search text; and
    including the decoy tokens as part of the plurality of possible token sets sent for delivery to the user.

16. The non-transitory computer-readable storage medium of claim 13, wherein the selected salt value is selected based on identities of users or messages.

17. The non-transitory computer-readable storage medium of claim 13, wherein the selected salt value is selected based on a conversation to which the message belongs.

18. The non-transitory computer-readable storage medium of claim 14, the instructions further comprising instructions for displaying, to the user, the plaintext messages having the given requisite degree of matches.

19. A computer-implemented method performed by a communication server, the method comprising:
    storing a search index, comprising, for each of a plurality of messages:
        an encrypted form of the message, and
        at least one transformed token corresponding to the message and derived by transforming at least one token from the message using a selected salt value from a plurality of possible salt values;
    receiving, from a searching client device, a plurality of possible transformed token sets generated by a client device using the plurality of possible salt values, the plurality of possible salt values comprising at least one of: a plurality of salt values corresponding to different time periods, or a plurality of salt values derived from user identities, message identities, or conversation identities;
    identifying, using the search index, messages that correspond to transformed tokens matching a transformed token set of the plurality of possible transformed token sets; and
    sending the identified messages to the searching client device.

20. The computer-implemented method of claim 19, wherein the communication server receives the encrypted forms of the messages from sending client devices and forwards the encrypted forms of the messages to receiving client devices.

* * * * *